US008352371B2

(12) United States Patent
Proctor (10) Patent No.: US 8,352,371 B2
(45) Date of Patent: Jan. 8, 2013

(54) LIMITING ACCESS TO SHARED MEDIA CONTENT

(75) Inventor: Lee Proctor, Cary, IL (US)

(73) Assignee: General Instrument Corporation, Horsham, PA (US)

( * ) Notice: Subject to any disclaimer, the term of this patent is extended or adjusted under 35 U.S.C. 154(b) by 930 days.

(21) Appl. No.: 12/112,747

(22) Filed: Apr. 30, 2008

(65) Prior Publication Data

US 2009/0275403 A1 Nov. 5, 2009

(51) Int. Cl.
*G06F 21/00* (2006.01)
(52) U.S. Cl. ............... 705/51; 705/904; 726/27; 726/28
(58) Field of Classification Search ...................... 705/51
See application file for complete search history.

(56) References Cited

U.S. PATENT DOCUMENTS

| | | | |
|---|---|---|---|
| 5,662,332 A | 9/1997 | Garfield | |
| 6,497,410 B1 | 12/2002 | Bernstein et al. | |
| 6,591,250 B1 | 7/2003 | Johnson et al. | |
| 6,656,050 B2 * | 12/2003 | Busch et al. | 705/18 |
| 6,675,216 B1 * | 1/2004 | Quatrano et al. | 709/229 |
| 6,745,236 B1 | 6/2004 | Hawkins et al. | |
| 6,848,997 B1 * | 2/2005 | Hashimoto et al. | 463/42 |
| 6,993,500 B2 | 1/2006 | Ishihara | |
| 7,130,908 B1 | 10/2006 | Pecus et al. | |
| 7,310,732 B2 * | 12/2007 | Matsuyama et al. | 705/59 |
| 7,526,451 B2 | 4/2009 | Park et al. | |
| 7,802,306 B1 * | 9/2010 | Adams et al. | 726/26 |
| 7,908,380 B1 * | 3/2011 | Chu et al. | 709/227 |
| 7,917,744 B2 * | 3/2011 | Radatti | 713/151 |
| 7,992,171 B2 * | 8/2011 | Amidon et al. | 725/50 |
| 2002/0026581 A1 * | 2/2002 | Matsuyama et al. | 705/51 |
| 2002/0065097 A1 * | 5/2002 | Brockenbrough et al. | 455/552 |
| 2002/0086732 A1 * | 7/2002 | Kirmse et al. | 463/42 |
| 2002/0094869 A1 * | 7/2002 | Harkham | 463/42 |
| 2002/0178087 A1 * | 11/2002 | Henderson et al. | 705/26 |
| 2003/0028597 A1 * | 2/2003 | Salmi et al. | 709/204 |
| 2003/0037075 A1 * | 2/2003 | Hannigan et al. | 707/500 |
| 2003/0064805 A1 * | 4/2003 | Wells | 463/39 |
| 2003/0084331 A1 * | 5/2003 | Dixon et al. | 713/200 |
| 2003/0156591 A1 * | 8/2003 | Sorsa | 370/401 |
| 2003/0177184 A1 * | 9/2003 | Dickerman et al. | 709/204 |
| 2003/0216962 A1 * | 11/2003 | Heller et al. | 705/14 |

(Continued)

OTHER PUBLICATIONS

Rosenblatt et al., "Digital Rights Management: Business and Technology," 2002, M&T Books, all pages.*

(Continued)

*Primary Examiner* — Jacob C. Coppola
(74) *Attorney, Agent, or Firm* — Stewart M. Wiener (57) ABSTRACT

The method shown in FIG. 4 continues with the iterative play cycles of the game, such as alternating moves between each player in the game. Player A operates a user interface on the game device 110A to select one of the content media items owned by Player A 236 to play during a move in the game (step 465). The user interface displays the selected content media item on the game device 110A which Player A operates (step 470) and sends a request to the game device 110B which Player B operates to reveal the selected content media item (step 475). The game device 110B which Player B operates receives the request (step 480) and reveals the selected content media item stored in the shared content media, such as in the shared content media items 238 shown in FIG. 2 (step 485).

18 Claims, 4 Drawing Sheets

U.S. PATENT DOCUMENTS

| | | |
|---|---|---|
| 2003/0224852 A1 | 12/2003 | Walker et al. |
| 2003/0225834 A1 | 12/2003 | Lee et al. |
| 2004/0002384 A1* | 1/2004 | Multerer et al. ............... 463/42 |
| 2004/0153670 A1* | 8/2004 | Casey et al. .................. 713/201 |
| 2004/0201626 A1* | 10/2004 | Lavoie et al. ................. 345/753 |
| 2004/0249953 A1* | 12/2004 | Fernandez et al. ............ 709/227 |
| 2005/0038707 A1* | 2/2005 | Roever et al. ................... 705/21 |
| 2005/0058094 A1* | 3/2005 | Lazaridis et al. ............. 370/328 |
| 2005/0137015 A1* | 6/2005 | Rogers et al. .................. 463/42 |
| 2005/0210396 A1* | 9/2005 | Galli .............................. 715/758 |
| 2005/0216524 A1* | 9/2005 | Gomes et al. ................. 707/201 |
| 2005/0220045 A1* | 10/2005 | Lin ................................ 370/313 |
| 2005/0220134 A1* | 10/2005 | Lin ................................ 370/437 |
| 2005/0256985 A1 | 11/2005 | Shea |
| 2005/0272505 A1 | 12/2005 | Okamura |
| 2006/0036548 A1* | 2/2006 | Roever et al. ................... 705/51 |
| 2006/0053380 A1* | 3/2006 | Spataro et al. ................ 715/753 |
| 2006/0068917 A1* | 3/2006 | Snoddy et al. .................. 463/42 |
| 2006/0127037 A1* | 6/2006 | Van Hoff et al. ................ 386/83 |
| 2006/0161635 A1* | 7/2006 | Lamkin et al. ................ 709/217 |
| 2006/0173960 A1* | 8/2006 | Zlateff et al. ................. 709/206 |
| 2006/0209727 A1* | 9/2006 | Jennings et al. .............. 370/260 |
| 2006/0234631 A1 | 10/2006 | Dieguez |
| 2007/0005989 A1* | 1/2007 | Conrado et al. ............... 713/189 |
| 2007/0094337 A1* | 4/2007 | Klassen et al. ................. 709/206 |
| 2007/0198419 A1 | 8/2007 | Park et al. |
| 2007/0214238 A1* | 9/2007 | Coppens et al. ............. 709/217 |
| 2007/0239557 A1* | 10/2007 | Phillips ........................... 705/26 |
| 2007/0275696 A1* | 11/2007 | Cheng et al. ................ 455/412.1 |
| 2008/0081698 A1* | 4/2008 | Wormald et al. ............... 463/42 |
| 2008/0109446 A1* | 5/2008 | Wang ............................... 707/10 |
| 2008/0139301 A1* | 6/2008 | Holthe ............................ 463/25 |
| 2008/0281699 A1* | 11/2008 | Whitehead ..................... 705/14 |
| 2009/0012961 A1* | 1/2009 | Bramson et al. .................. 707/9 |
| 2009/0138974 A1* | 5/2009 | Perdomo et al. ................ 726/28 |
| 2009/0180621 A1 | 7/2009 | Kratz et al. |
| 2009/0181767 A1* | 7/2009 | Feng ............................... 463/29 |
| 2009/0275403 A1* | 11/2009 | Proctor ........................... 463/29 |

OTHER PUBLICATIONS

White, How Computers Work, 2004, Que Publ., Seventh Edition, all pages.*

PCT Search Report and Written Opinion, RE: Application #PCT/US2009/040301 Jun. 9, 2009.

Office Action, Chinese Application No. 20090115008, Apr. 19, 2012.

Office Action, Korean Application No. 10-2010-7024273, May 30, 2012.

* cited by examiner

LIMITING ACCESS TO SHARED MEDIA CONTENT

BACKGROUND

1. Field of the Invention

The present invention relates, in general, to various game systems and game programs such as a trading card game, role playing game, adventure game, and the like. In particular, aspects of the present invention provide a system and method for limiting access to shared content media items stored in a device.

2. Description of Related Art

Collectable card games, trading card games, board games, and massively multiplayer online role-playing games are an appealing genre of games because they combine collecting with strategic game play. Modern trading card games utilize a game console or personal computer to simulate collecting cards and playing the trading card game. The Internet provides the ability to play trading card games and board games online and has increased the popularity of trading card games and also rejuvenated the popularity of board games. Online trading card games are available for a multitude of subjects. In massively multiplayer online role-playing games a large number of players interact with one another in a virtual world in which the players assume the role of a fictional character and take control over many of the character's actions.

Current trading card games for portable platforms, such as the Marvel Trading Card Game, allow a player to purchase cards and build decks of cards that the player will use to play against other players via either a wired or wireless connection. Since these cards are already resident on the game cartridge inserted into the platforms, the same cards are available to both players in a game.

The Marvel game also supports online play that includes the ability to purchase additional cards that are not part of the baseline game on the cartridge. Each playing card will include a card image and additional text description that explains that specific card's effect, or modification, on the game. These cards may only be used for only play via a game server. The Marvel game allows a player to build a deck of cards offline, but the deck of cards may only be used for play via a game server.

In massively multiplayer online role-playing games, such as World of Warcraft, players interact with one another in a virtual world. Each player has an avatar that is the player's computer representation of himself or herself, and a description of the player's character. Each player explores the landscape in a persistent digital video game world, fighting monsters, performing quests, building skills, and interacting with non-player characters, and other player characters. The game rewards success with in-game money, items, experience and reputation, which allow the player to improve their skill and power.

SUMMARY

Embodiments of the present invention provide a method and system for limiting access to shared content media items stored in a device. An exemplary method establishes a connection with another device and initiates a session with the other device. The method synchronizes the device and the other device by receiving a copy of content media items stored on the other device, and storing the received copy of the content media items as shared content media items on the device. The synchronizing of the device and the other device may include transmitting a copy of content media items stored on the device to the other device. The method allows a user operating the device to access the content media items, but restricts access to the shared content media items based on the status of the session with the other device.

In one embodiment, the user operating the device selects one of the content media items on the device. If the session is a game, the selection by the user plays the selected content media item in the game. The method displays the selected content media item on the device, and sends a request to the other device to display the item in the content media items transmitted to the other game device that corresponds to the selected content media item. In another embodiment, the user operating the device receives a request from the other device to reveal an item in the shared content media items. The device displays the item in the shared content media items based on the request. In yet another embodiment, the user breaks the connection to the other game device and deletes the shared content media items stored in the device.

BRIEF DESCRIPTION OF THE DRAWINGS

Embodiments are illustrated by way of example and not limited in the following figures, in which like numerals indicate like elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Before describing in detail embodiments that are in accordance with the present invention, it should be observed that the embodiments reside primarily in combinations of method steps and apparatus components related to limiting access to shared content media items in a game between a first player operating a first game device, and a second player operating a second game device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
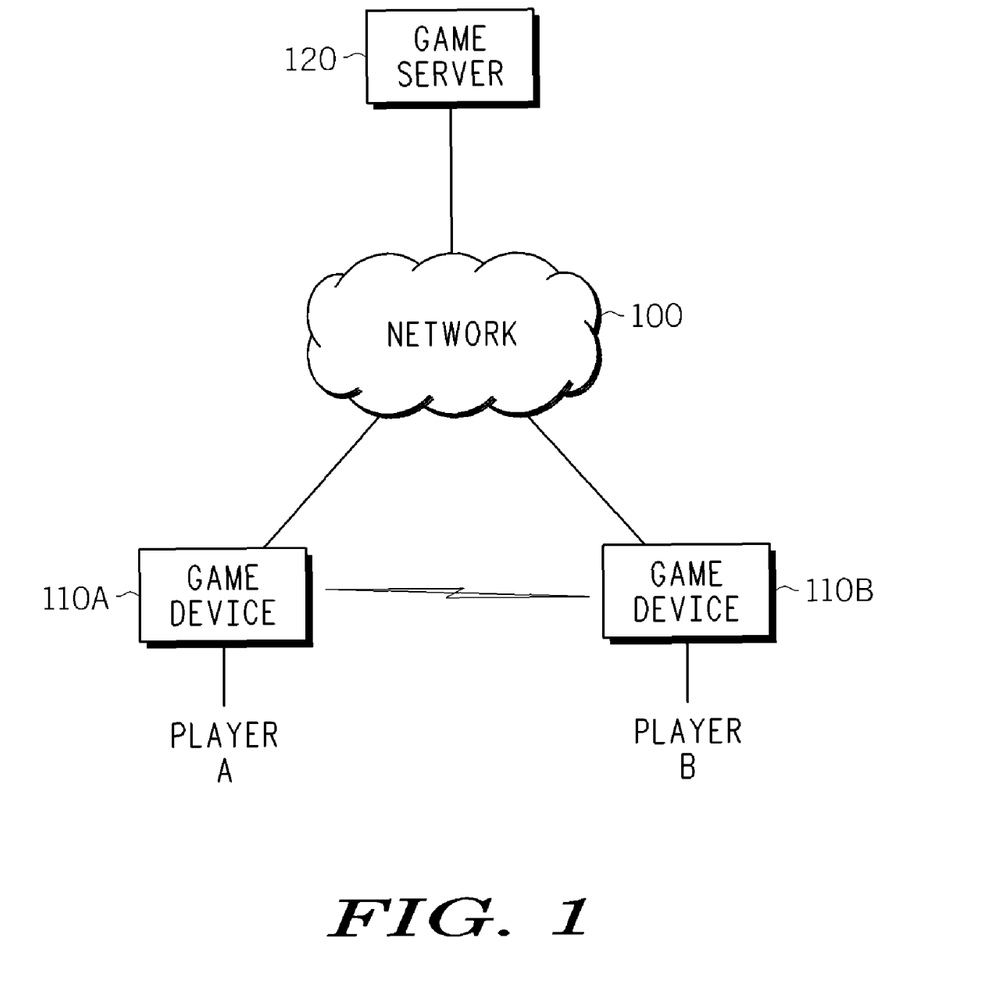
FIG. 1 is a network diagram that illustrates an exemplary embodiment of the hardware components of a system operable in accordance with the present invention.

FIG. 1 is a network diagram that illustrates an exemplary embodiment of the hardware components of a system operable in accordance with the present invention. The architecture shown in FIG. 1 utilizes a network 100 to connect game devices 110A, 110B to a game server 120. In one embodiment, Player A operates a game device 110A that connects to the game server 120, via the network 100, to perform a method embodying aspects of the present invention, and Player B operates another game device 110B that connects to the game server 120, via the network 100, to perform a method embodying aspects of the present invention. In another embodiment, the game device 110A which Player A operates is connected to the game device 110B which Player B operates to perform a method embodying aspects of the present invention. The connection between the game device 110A which Player A operates and the game device 110B which Player B operates is a peer-to-peer network connection, mobile ad-hoc network connection, wireless ad-hoc network connection, Bluetooth, short range wireless connection, or the like, to either connect the game devices 110A, 110B directly or via the network 100. In yet another embodiment, the game devices 110A, 110B and the game server 120 shown in FIG. 1 utilize distributed processing to perform a method embodying aspects of the present invention.

The network 100 shown in FIG. 1, in an exemplary embodiment, is a public communication network that connects and enables data transfer between the game devices 110A, 110B and the game server 120. The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA) or Code Division Multiple Access (CDMA) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

Figure 2:
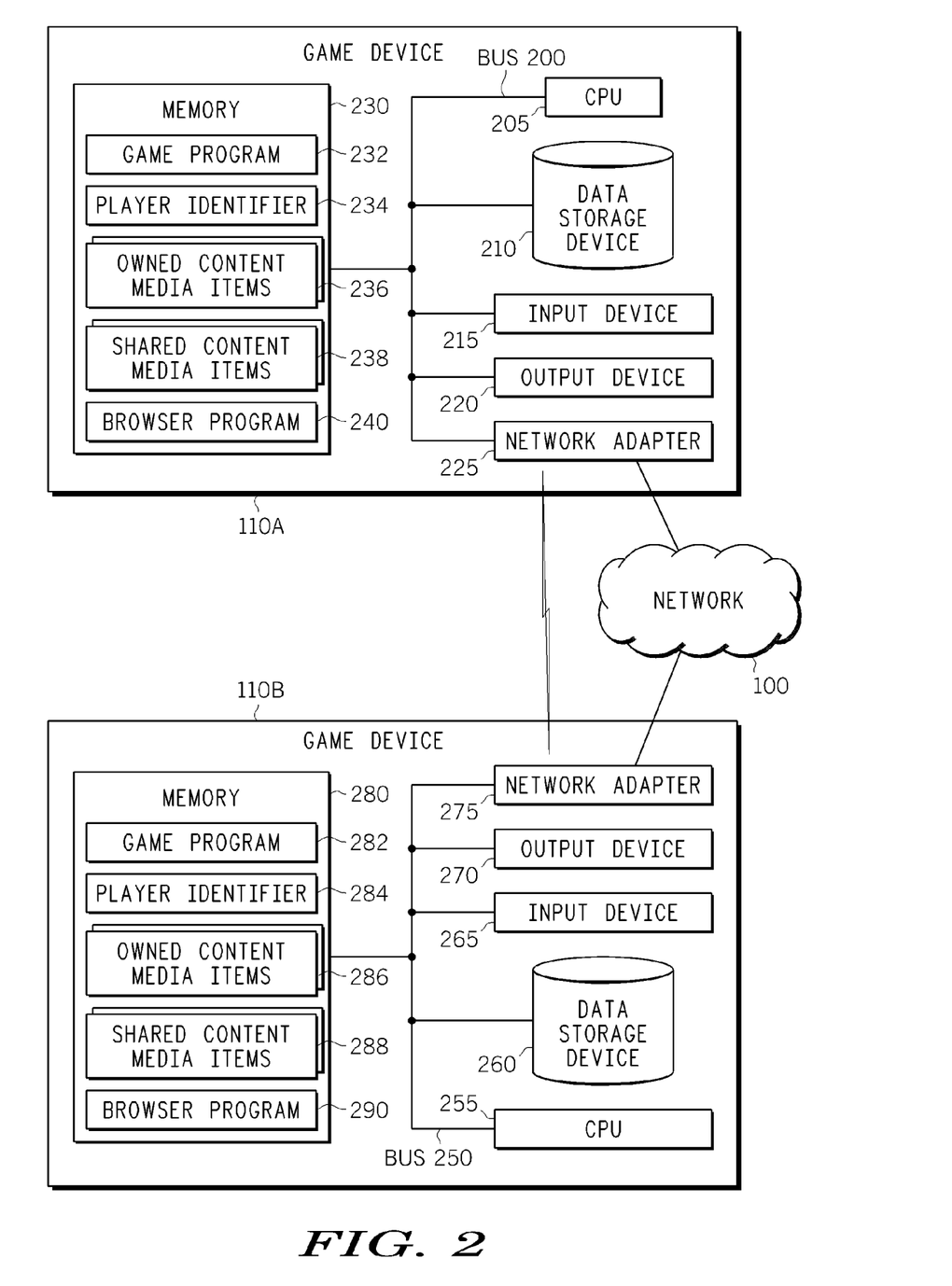
FIG. 2 and FIG. 3 are block diagrams that illustrate, in detail, an exemplary embodiment of the hardware components shown in FIG. 1.

FIG. 2 is a block diagram that illustrates, in detail, an exemplary embodiment of the hardware components shown in FIG. 1. In particular, FIG. 2 illustrates the hardware and software components that comprise the game device 110A which Player A operates and the game device 110B which Player B operates.

As shown in FIG. 2, the game device 110A can comprise a general-purpose computer, such as a mobile telephone, handheld game console, mobile computer, desktop computer, or the like. A bus 200 is a communication medium that connects a central processor unit (CPU) 205, data storage device 210 (such as a disk drive, or flash memory), input device 215 (such as a keyboard, keypad, or touchscreen), output device 220 (such as a monitor, or graphic display), network adapter 225, and memory 230. In one embodiment, the network adapter 225 also connects to the network 100 and is the mechanism that facilitates the passage of network traffic between the game device 110A and the network 100. In another embodiment, the network adapter 225 also connects to another game device 110B and is the mechanism that facilitates the passage of network traffic between the game device 110A and the other game device 110B.

The CPU 205 performs the disclosed methods by executing the sequences of operational instructions that comprise each computer program resident in, or operative on, the memory 230. The reader should understand that the memory 230 may include operating system, administrative, and database programs that support the programs disclosed in this application. In one embodiment, the configuration of the memory 230 of the game device 110A includes a game program 232, player identifier 234, owned content media items 236, shared content media items 238, and browser program 240. The game program 232 performs the method of the present invention. In one embodiment, the player identifier 234 is stored in a file referred to as a cookie. The game server 120 may assign and send the player identifier 234 to the game device 110A once when the game device 110A first communicates with the game server 120. From then on, the game device 110A includes the player identifier 234 with all messages sent to the game server 120 so the game server 120 can identify the source of the message. In another embodiment, the player identifier 234 is installed on the game device 110A by the manufacturer. The owned content media items 236 and shared content media items 238 include trading cards, character roles, or the like. In one embodiment, the owned content media items 236 store the content media that Player A either purchases from the game server 120 or obtains in a trade with the game server 120 or another player, and the shared content media items 238 store the content media that that game device 110A receives from another game device during a game synchronization process. Since Player A is the owner of the owned content media items 236, Player A has full access rights to use the owned content media items 236, including viewing, playing, manipulating, trading, and deleting the owned content media items 236 either before, during, or after a game. Since Player A is not the owner of the shared content media items 238, Player A has limited access rights to the shared content media items 238. The limited access rights include no viewing or manipulation without the consent of the owner or the game device operated by the owner of the shared content media items 238, and deleting only when there is no connection to the owner's game device. In addition, a connection needs to exist between the game device 110A that stores the shared content media items 238 and the game device operated by the owner of the shared content media items 238 to enable viewing or manipulation. However, for faster game setup and reduced data exchange, the shared content media items 238 would typically remain on the game device 110A even after the session/connection has been broken. The player identifier of the owner of the shared content media items 238 is stored with the shared content media items 238, and the level of access would depend on connection to the game device operated by the owner of the shared content media items 238. For example, Player A may be able to look at the number of cards stored in the shared content media items 238, but cannot view individual items until establishment of a connection and game session. In another embodiment, the owned content media items 236 and the shared content media item 238 are stored together and each item is associated with an identifier, such as the player identifier 234, to identify the owner of the item, and determine the rights that Player A has to use the item. The browser program 240 displays web pages on the output device 220. These computer programs store intermediate results in the memory 230, or data storage device 210. In another embodiment, the memory 230 may swap these programs, or portions thereof, in and out of the memory 230 as needed, and thus may include fewer than all of these programs at any one time.

The game device 110B, shown in FIG. 2, is also a general-purpose computer, such as a mobile telephone, handheld game console, mobile computer, desktop computer, or the like. A bus 250 is a communication medium that connects a central processor unit (CPU) 255, data storage device 260 (such as a disk drive, or flash memory), input device 265 (such as a keyboard, keypad, or touchscreen), output device 270 (such as a monitor, or graphic display), network adapter 275, and memory 280. In one embodiment, the network adapter 275 also connects to the network 100 and is the mechanism that facilitates the passage of network traffic between the game device 110B and the network 100. In another embodiment, the network adapter 275 also connects to another game device 110A and is the mechanism that facilitates the passage of network traffic between the game device 110B and the other game device 110A.

The CPU 255 performs the disclosed methods by executing the sequences of operational instructions that comprise each computer program resident in, or operative on, the memory 280. The reader should understand that the memory 280 may include operating system, administrative, and database programs that support the programs disclosed in this application. In one embodiment, the configuration of the memory 280 of the game device 110B includes a game program 282, player identifier 284, owned content media items 286, shared content media items 288, and browser program 290. The game program 282 performs the method of the present invention. In one embodiment, the player identifier 284 is stored in a file referred to as a cookie. The game server 120 may assign and send the player identifier 284 to the game device 110B once when the game device 110B first communicates with the game server 120. From then on, the game device 110B includes the player identifier 284 with all messages sent to the game server 120 so the game server 120 can identify the source of the message. In another embodiment, the player identifier 284 is installed on the game device 110B by the manufacturer. The owned content media items 286 and shared content media items 288 include trading cards, character roles, or the like. In one embodiment, the owned content media items 286 store the content media that Player B either purchases from the game server 120 or obtains in a trade with the game server 120 or another player, and the shared content media items 288 store the content media that that game device 110B receives from another game device during a game synchronization process. Since Player B is the owner of the owned content media items 286, Player B has full access rights to use the owned content media items 286, including viewing, playing, manipulating, trading, and deleting the owned content media items 286 either before, during, or after a game. Since Player B is not the owner of the shared content media items 288, Player B has limited access rights to the shared content media items 288. The limited access rights include no viewing or manipulation without the consent of the owner or the game device operated by the owner of the shared content media items 288, and deleting only when there is no connection to the owner's game device. In addition, a connection needs to exist between the game device 110B that stores the shared content media items 288 and the game device operated by the owner of the shared content media items 288 to enable viewing or manipulation. However, for faster game setup and reduced data exchange, the shared content media items 288 would typically remain on the game device 110B even after the session/connection has been broken. The player identifier of the owner of the shared content media items 288 is stored with the shared content media items 288, and the level of access would depend on connection to the game device operated by the owner of the shared content media items 288. For example, Player B may be able to look at the number of cards stored in the shared content media items 288, but cannot view individual items until establishment of a connection and game session. In another embodiment, the owned content media items 286 and the shared content media item 288 are stored together and each item is associated with an identifier, such as the player identifier 284, to identify the owner of the item, and determine the rights that Player B has to use the item. The browser program 290 displays web pages on the output device 270. These computer programs store intermediate results in the memory 280, or data storage device 260. In another embodiment, the memory 280 may swap these programs, or portions thereof, in and out of the memory 280 as needed, and thus may include fewer than all of these programs at any one time.

Figure 3:
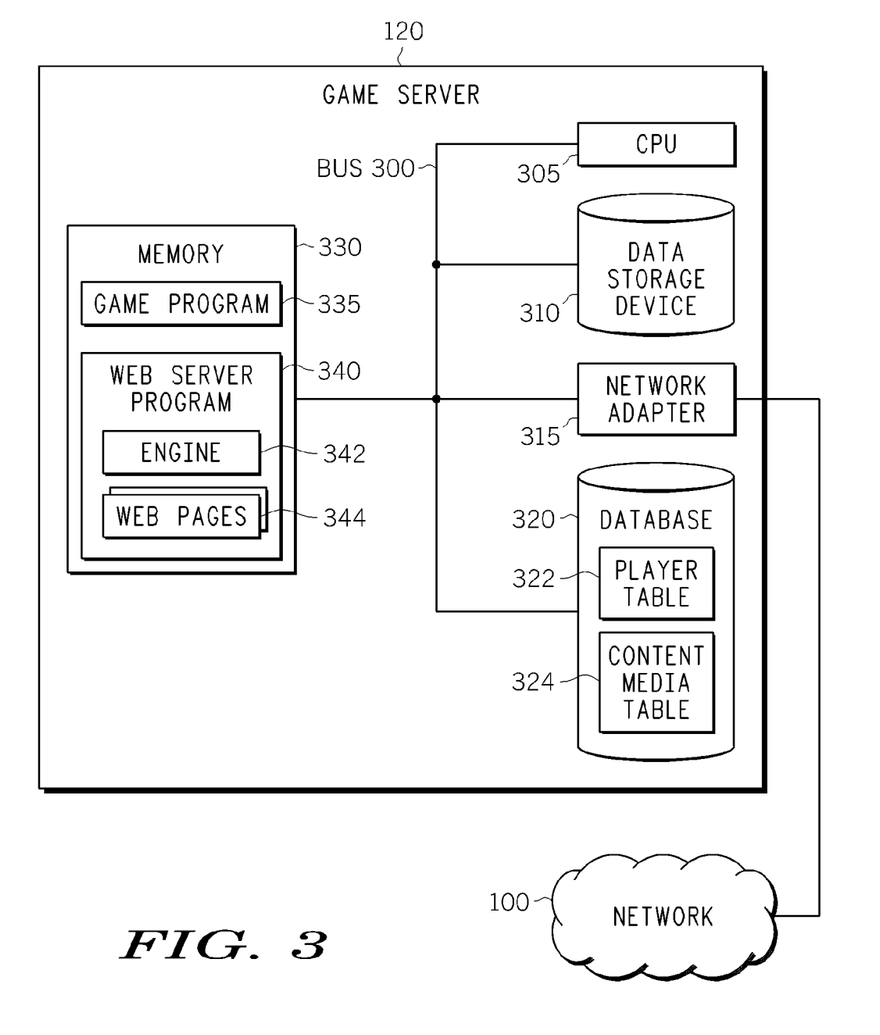

FIG. 3 is a block diagram that illustrates, in detail, an exemplary embodiment of the hardware components shown in FIG. 1. In particular, FIG. 3 illustrates, in detail, the hardware and software components that comprise the game server 120.

As shown in FIG. 3, the game server 120 is a general-purpose computer that provides server functionality including file services, web page services, and the like. A bus 300 is a communication medium that connects a central processor unit (CPU) 305, data storage device 310 (such as a disk drive, or flash memory), network adapter 315, database 320, and memory 330. The network adapter 315 also connects to the network 100 and is the mechanism that facilitates the passage of network traffic between the game server 120 and the network 100.

The database 320 is a collection of data organized in such a way that a database management system can quickly store, modify, and extract the data from the database 320. In one embodiment, the collection of data for the database 320 includes a player table 322, and a content media table 324. The player table 322 stores data related to each player registered with the game server 120 and operating the game devices 110A, 110B. The content media table 324 stores the content media that each registered player owns, and a status of the content media, including whether the registered player wants to trade or sell the content media. The database management system may employ a relational, flat, hierarchical, object-oriented architecture, or the like.

The CPU 305 performs the disclosed methods by executing the sequences of operational instructions that comprise each computer program resident in, or operative on, the memory 330. The reader should understand that the memory 330 may include operating system, administrative, and database programs that support the programs disclosed in this application. In one embodiment, the configuration of the memory 330 of the server computer 120 includes a game program 335, and web server program 340. The game program 335 performs a method embodying aspects of the present invention. The web server program 340 includes an engine 342, and web pages 344. These computer programs store intermediate results in the memory 330, database 320, or data storage device 310. These programs also receive input from the players operating the game devices 110A, 110B, access the database 320, and display the results to the players operating the game devices 110A, 110B. In another embodiment, the memory 330 may swap these programs, or portions thereof, in and out of the memory 330 as needed, and thus may include fewer than all of these programs at any one time.

The engine 342 of the web server program 340 receives requests such as hypertext transfer protocol (HTTP) requests from the game devices 110A, 110B to access the web pages 344 identified by uniform resource locator (URL) addresses and provides the web pages 344 in response. The requests include a registration request, purchase request, trade request, and game initiation request. The engine 342 receives the registration request from the game device 110A which Player A operates to add Player A as a registered player of a game. The engine 342 receives the purchase request from the game device 110A which Player A operates to purchase content media for Player A. The engine 342 receives the trade request from the game device 110A which Player A operates to trade or sell a content media item that Player A owns. The engine 342 receives the game initiation request from the game device 110A to begin a game with another registered player.

Figure 4:
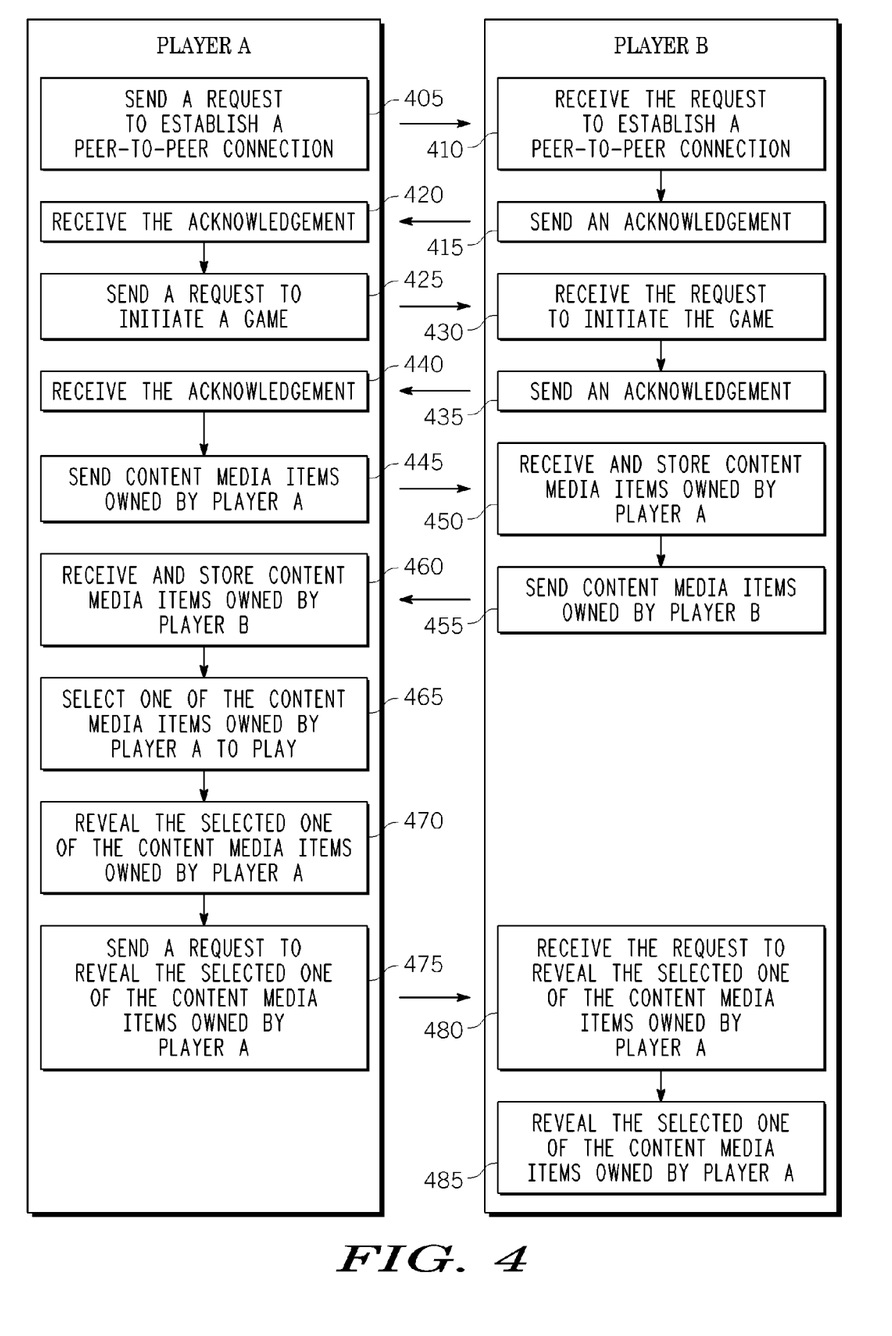
FIG. 4 is a message flow diagram that illustrates an exemplary embodiment of a method in accordance with the present invention.

FIG. 4 is a message flow diagram that illustrates an exemplary embodiment of a method embodying aspects of the present invention. In particular, FIG. 4 illustrates the communication between a game device 110A which Player A operates, and a game device 110B which Player B operates. The method shown in FIG. 4 begins with the game device 110A which Player A operates sending a request to the game device 110B which Player B operates to establish a peer-to-peer connection (step 405). The game device 110B which Player B operates receives the request (step 410). If the game device 110B which Player B operates is accepting connections, it sends an acknowledgement to the game device 110A which Player A (step 415). The establishment of the peer-to-peer connection is complete when the game device 110A which Player A operates receives the acknowledgement (step 420).

The method shown in FIG. 4 continues when Player A operates a user interface on the game device 110A to initiate a game with Player B. The user interface sends a request to the game device 110B which Player B operates to initiate a game with Player B (step 425). The game device 110B which Player B operates receives the request (step 430). If Player B consents to initiate a game with Player A, Player B operates a user interface on the game device 110B to accept the game initiation request. The user interface sends an acknowledgement to the game device 110A which Player A operates (step 435). The game initiation is complete when the game device 110A which Player A operates receives the acknowledgement (step 440).

The method shown in FIG. 4 continues when the game device 110A which Player A operates and the game device 110B which Player B operates begin a synchronization process. The game device 110A which Player A operates begins the synchronization process by sending the content media owned by Player A (step 445), such as the owned content media items 236 shown in FIG. 2. The game device 110B which Player B operates receives the content media owned by Player A (step 450) and stores it, such as in the shared content media items 288 shown in FIG. 2. In response, the game device 110B which Player B operates sends the content media owned by Player B (step 455), such as the owned content media items 286 shown in FIG. 2. The game device 110A which Player A operates receives the content media owned by Player B (step 460) and stores it, such as in the shared content media items 238 shown in FIG. 2. When the synchronization process is complete, the game device 110A which Player A operates and the game device 110B which Player B operates each store the content media items owned by the other game device as shared content media items. Since the player is not the owner of the shared content media items, the player has limited access rights to the shared content media items. The shared content media items are initially hidden from the player, the player may only view the shared content media when the owner of the shared content media consents to the viewing, such as when the owner elects to play the one of the shared content media items during a move in the game, and the player may only delete the shared content media when the owner of the shared content media items is not connected to the game device that the player is operating.

The method shown in FIG. 4 continues with the iterative play cycles of the game, such as alternating moves between each player in the game. Player A operates a user interface on the game device 110A to select one of the content media items owned by Player A 236 to play during a move in the game (step 265). The user interface displays the selected content media item on the game device 110A which Player A operates (step 270) and sends a request to the game device 110B which Player B operates to reveal the selected content media item (step 475). The game device 110B which Player B operates receives the request (step 480) and reveals the selected content media item stored in the shared content media, such as in the shared content media items 238 shown in FIG. 2 (step 485).

Aspects of the present invention also provide support for multi-user ownership of content media items. In an illustrative example in accordance with an embodiment, Player A does not own content media item X, but fellow gamers Player B, Player C, and Player D own content media item X. The game device that Player A operates will store a limited use copy of content media item X and a list of associated owners (i.e., Player B, Player C, and Player D). Only when the game device that Player A operates is in communication/gaming with a game device operated by Player B, Player C, or Player D will access to the content media item X image and associated game modification rules occur. In this example, Player B may sell or trade the ownership right to content media item X to another player. When Player A connects to the online game server, the ownership rights stored in his device for content media item X is updated to reflect that Player B no longer has ownership right to content media item X. If all of the owners of content media item X (i.e., Player B, Player C, and Player D) sell or trade their ownership right to content media item X, the online game server directs the game device that Player A operates to delete the content media item X.

In another exemplary embodiment, the shared content media items disclosed in the present invention include photographs, music, and the like. In this embodiment, the level of access to the shared content media items stored on the user device depends on the level of connectivity with the device of the owner of the shared content media items.

Although the disclosed exemplary embodiments describe a fully functioning system and method for limiting access to shared content media items in a game between a first player operating a first game device that includes first content media items, and a second player operating a second game device that includes second content media items, the reader should understand that other equivalent exemplary embodiments exist. Since numerous modifications and variations will occur to those reviewing this disclosure, the system and method for limiting access to shared content media items in a game between a first player operating a first game device that includes first content media items, and a second player operating a second game device that includes second content media items is not limited to the exact construction and operation illustrated and disclosed. Accordingly, this disclosure intends all suitable modifications and equivalents to fall within the scope of the claims.

I claim:

1. A method for limiting access to shared content media items stored on a device, comprising:
   initiating a session with another device operated by an owner of the shared content media items, wherein the initiating of the session comprises establishing a peer-to-peer connection with the other device;
   receiving a copy of content media items stored on the other device;
   storing the received copy of the content media items as shared content media items on the device;
   limiting access rights of a user operating the device to the shared content media items,
   wherein the limited access rights comprise a right to view or manipulate the shared content media items, the right exercisable if the session is active and if the owner consents to viewing or manipulating,
   wherein the limited access rights further comprise a right to delete the shared content media items, the right exercisable if the session is not active;
   receiving a request from the other device to reveal an item from the content media items received from the other device and stored in the shared content media items, wherein the request indicates consent by the owner for the user to view or manipulate the item; and
   in response to receiving the request, revealing the item from the shared content media items to the user operating the device in accordance with the limited access rights, thereby allowing the user to view or manipulate the item.

2. The method of claim 1, further comprising:
   transmitting a copy of content media items stored on the device to the other device;
   selecting one of the content media items on the device;
   displaying the selected one of the content media items on the device; and
   sending a request to the other device to display the item in the copy of the content media items transmitted to the other device that corresponds to the selected one of the content media items,
   wherein an identifier is associated with each content media item, the identifier identifying the user operating the device, and allowing access of the user operating the device to the item.

3. The method of claim 1, further comprising:
   breaking the session with the other device; and
   deleting the shared content media items.

4. The method of claim 1, wherein an identifier is associated with each shared content media item, the identifier identifying another user, and restricting access of the user operating the device to the item.

5. The method of claim 1, wherein the session comprises at least one of a card game, a trading card game, a board game, and a role playing game.

6. The method of claim 1, wherein the content media items comprise at least one of a playing card description, a trading card description, a card image, a game modification, a character image, a character description, a video, and an avatar.

7. A system for limiting access to shared content media items stored in a device, the system comprising:
   a network adapter resident in the device;
   a memory device resident in the device; and
   a processor disposed in communication with the memory device, the processor programmed to:
      initiate a session with another device operated by an owner of the shared content media items, wherein to initiate the session, the processor is further programmed to establish, through the network adapter, a peer-to-peer connection with the other device;
      receive, via the peer-to-peer connection, a copy of content media items stored on the other device;
      store the received copy of the content media items as shared content media items on the device;
      limit access rights of the user operating the device to the shared content media items,
      wherein the limited access rights comprise a right to view or manipulate the shared content media items, the right exercisable if the session is active and if the owner consents to viewing or manipulating,
      wherein the limited access rights further comprise a right to delete the shared content media items, the right exercisable if the session is not active;
      receive a request from the other device to reveal an item from the content media items received from the other device and stored in the shared content media items, wherein the request indicates consent by the owner for the user to view or manipulate the item; and
      in response to receiving the request, reveal the item from the shared content media items to the user operating the device in accordance with the limited access rights, thereby allowing the user to view or manipulate the item.

8. The system of claim 7, wherein the processor is further programmed to:
   transmit a copy of content media items stored on the device to the other device;
   select one of the content media items on the device;
   display the selected one of the content media items on the device; and
   send a request to the other device to display the item in the copy of the content media items transmitted to the other device that corresponds to the selected one of the content media items,
   wherein an identifier is associated with each content media item, the identifier identifying the user operating the device, and allowing access of the user operating the device to the item.

9. The system of claim 7, wherein the processor is further programmed to:
   break a connection to the other device; and
   delete the shared content media items.

10. The system of claim 7, wherein an identifier is associated with each shared content media item, the identifier identifying another user, and restricting access of the user operating the device to the item.

11. The system of claim 7, wherein the session comprises at least one of a card game, a trading card game, a board game, and a role playing game.

12. The system of claim 7, wherein the content media items comprise at least one of a playing card description, a trading card description, a card image, a game modification, a character image, a character description, a video, and an avatar.

13. A non-transitory tangible computer-readable medium having computer-executable instructions embodied thereon for limiting access to shared content media items stored in a device, wherein the instructions, when executed by at least one processor of the device, cause the at least one processor to perform a method comprising:

- initiating a session with another device operated by an owner of the shared content media items, wherein the initiating of the session comprises establishing a peer-to-peer connection with the other device;
- receiving a copy of content media items stored on the other device;
- storing the received copy of the content media items as shared content media items on the device;
- limiting access rights of a user operating the device to the shared content media items,
- wherein the limited access rights comprise a right to view or manipulate the shared content media items, the right exercisable if the session is active and if the owner consents to viewing or manipulating,
- wherein the limited access rights further comprise a right to delete the shared content media items, the right exercisable if the session is not active;
- receiving a request from the other device to reveal an item from the content media items received from the other device and stored in the shared content media items, wherein the request indicates consent by the owner for the user to view or manipulate the item; and
- in response to receiving the request, revealing the item from the shared content media items to the user operating the device in accordance with the limited access rights, thereby allowing the user to view or manipulate the item.

14. The computer-readable medium of claim 13, the method further comprising:

- transmitting a copy of content media items stored on the device to the other device;
- selecting one of the content media items on the device;
- displaying the selected one of the content media items on the device; and
- sending a request to the other device to display the item in the copy of the content media items transmitted to the other device that corresponds to the selected one of the content media items,
- wherein an identifier is associated with each content media item, the identifier identifying the user operating the device, and allowing access of the user operating the device to the item.

15. The computer-readable medium of claim 13, the method further comprising:

- breaking a connection to the other device; and
- deleting the shared content media items.

16. The computer-readable medium of claim 13, wherein an identifier is associated with each shared content media item, the identifier identifying another user, and restricting access of the user operating the device to the item.

17. The computer-readable medium of claim 13, wherein the session comprises at least one of a card game, a trading card game, a board game, and a role playing game.

18. The computer-readable medium of claim 13, wherein the content media items comprise at least one of a playing card description, a trading card description, a card image, a game modification, a character image, a character description, a video, and an avatar.

* * * * *